(12) United States Patent
Haderle et al.

(10) Patent No.: US 6,289,355 B1
(45) Date of Patent: Sep. 11, 2001

(54) FAST LOG APPLY

(75) Inventors: Donald J. Haderle, Los Gatos; Thomas Majithia, San Jose, both of CA (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/153,998

(22) Filed: Sep. 16, 1998

(51) Int. Cl.$^7$ .............................. H02H 3/05; G06F 7/00; G06F 12/00
(52) U.S. Cl. .................. 707/200; 707/1; 707/7; 707/200; 714/20
(58) Field of Search .................. 707/7, 1, 200, 707/201, 202; 714/20

(56) References Cited

U.S. PATENT DOCUMENTS

| | | |
|---|---|---|
| 5,278,982 | 1/1994 | Daniels et al. |
| 5,313,625 | 5/1994 | Hess et al. |
| 5,377,016 | 12/1994 | Kashiwagi et al. |
| 5,696,967 | * 12/1997 | Hayashi et al. .............. 395/618 |
| 5,740,434 | * 4/1998 | Eastep .............................. 395/618 |
| 5,974,425 | * 10/1999 | Obermarck et al. ............. 707/207 |
| 6,016,553 | * 1/2000 | Schneider et al. ................ 714/21 |

OTHER PUBLICATIONS

"Hardware Data Recovery at Task Level", *IBM® Technical Disclosure Bulletin*, 33(6B):201–204 (Nov. 1990).
"Recovery Protocol for Nested Transactions Using Write— Ahead logging", *IBM® Technical Disclosure Bulletin*, 31(4):2 pages (Sep. 1988).

* cited by examiner

*Primary Examiner*—Robert Beausoleil
*Assistant Examiner*—Tim Vo
(74) *Attorney, Agent, or Firm*—Gates & Cooper LLP

(57) ABSTRACT

The present invention discloses a technique for restoring a database in a computer. In accordance with the present invention, the database contains objects and is stored on a data storage device connected to the computer. After a system failure, a log file is read. The log file contains one or more modifications to the database objects. Each modification has an associated data page and time stamp or sequence number. The modifications are sorted by at least one predefined sorting key value. The sorted modifications are then grouped by database object. The sorted modifications are applied to each database object in parallel.

18 Claims, 6 Drawing Sheets

FAST LOG APPLY

BACKGROUND OF THE INVENTION

1. Field of the Invention

This invention relates in general to computer-implemented database management systems, and, in particular, to improving database recovery time after a system failure.

2. Description of the Related Art

Database management systems (DBMSs) are computerized information storage and retrieval systems. Relational database management systems (RDBMSs) are DBMSs that store and retrieve data that is organized as tables. A table consists of rows and columns of data. The rows are formally called tuples. A database will typically have many tables and each table will typically have multiple tuples and multiple columns.

A common technique for storing a database in a data storage device is to assign each table to a tablespace. A tablespace is a named collection of one or more datasets. Each tablespace is physically divided into equal units called data pages, and each data page contains one or more tuples of data.

DBMSs are susceptible to data loss after a system failure. To prevent such a data loss, DBMSs usually copy the database from a volatile storage device to a non-volatile storage device, such as a direct access storage device (DASD). Additionally, as data changes occur, DBMSs commonly record these changes in a recovery log. A recovery log is a list of time-ordered actions that indicate what changes were made to the database and in what order those changes were made. The recovery log may be stored in a data storage device, such as DASD or a buffer.

As shown in FIG. 1, prior art recovery techniques generally involve reading a log 102 and applying the log records 104 to an associated data page or data page set 106. Specifically, the data page 106 is read from a buffer or from the DASD, and required changes are made to the data page 106. This process is repeated until all the data pages 106 are read, and the database is restored to the state it was in before the system failure. Because many different log records 104 can apply to the same data page 106, a data page 106 may be read many times. Reading a data page 106 multiple times increases the number of input/output operations and increases the log apply time. Thus, there is a need for an improved recovery technique.

SUMMARY OF THE INVENTION

To overcome the limitations in the prior art described above, and to overcome other limitations that will become apparent upon reading and understanding the present specification, the present invention discloses a technique for restoring a database in a computer.

In accordance with the present invention, the database contains objects and is stored on a data storage device connected to the computer. After a system failure, a log file is read. The log file contains one or more modifications to the database objects. Each modification has an associated data page and time stamp or sequence number. The modifications are sorted by at least one predefined sorting key value. The sorted modifications are then grouped by database object. The sorted modifications are applied to each database object in parallel.

An objective of an embodiment of the present invention is to speed up the log apply time, and thus, improve the database recovery time after a system failure. A further objective of an embodiment of the present invention is to retain the time-ordering of database actions, while performing a log apply on multiple database objects in parallel.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
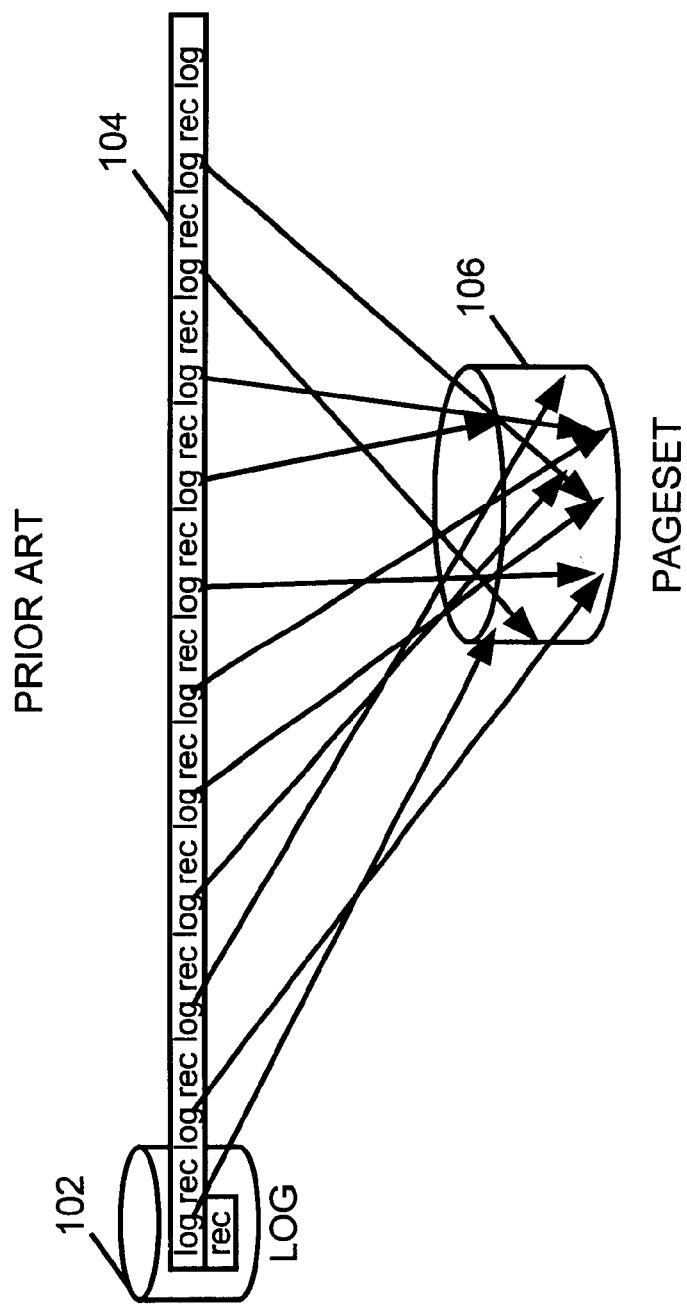
FIG. 1 represents a typical prior art data recovery technique.
Figure 2:
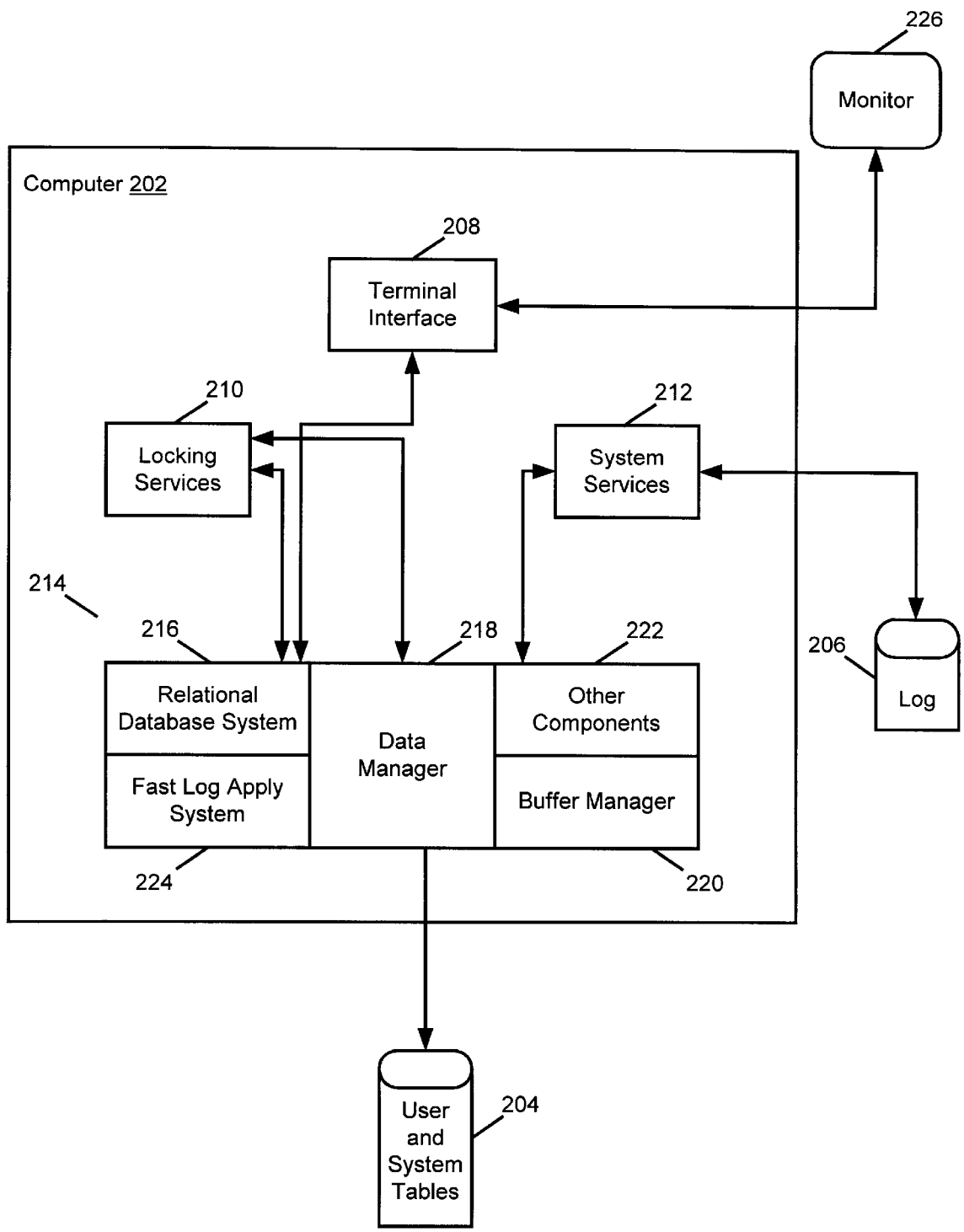
FIG. 2 illustrates an exemplary computer hardware environment that could be used in accordance with the present invention.

FIG. 2 illustrates an exemplary computer hardware environment that could be used in accordance with the present invention. In the exemplary environment, a computer system 202 is comprised of one or more processors connected to one or more data storage devices 204 and 206 that store one or more relational databases, such as a fixed or hard disk drive, a floppy disk drive, a CDROM drive, a tape drive, or other device.

Operators of the computer system 202 use a standard operator interface 208, such as IMS/DB/DC®, CICS®, TSO®, OS/390®, ODBC® or other similar interface, to transmit electrical signals to and from the computer system 202 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the MVS® or OS/390® operating systems. Those skilled in the art will recognize, however, that the present invention has application program to any RDBMS software, whether or not the RDBMS software uses SQL.

As illustrated in FIG. 2, the DB2® system for the MVS® operating system includes three major components: the Internal Resource Lock Manager (IRLM) 210, the Systems Services module 212, and the Database Services module 214. The IRLM 210 handles locking services for the DB2® system, which treats data as a shared resource, thereby allowing any number of users to access the same data simultaneously. Thus concurrency control is required to isolate users and to maintain data integrity. The Systems Services module 212 controls the overall DB2® execution environment, including managing log data sets 206, gathering statistics, handling startup and shutdown, and providing management support.

At the center of the DB2® system is the Database Services module 214. The Database Services module 214 contains several submodules, including the Relational Database System (RDS) 216, the Data Manager 218, the Buffer Manager 220, the Fast Log Apply System 224, and other components 222 such as an SQL compiler/interpreter. These submodules support the functions of the SQL language, i.e. definition, access control, interpretation, compilation, database retrieval, and update of user and system data. The Fast Log Apply System 224 works in conjunction with the other submodules to speed up the log apply time, and thus, improve the database recovery time after a system failure.

The present invention is generally implemented using SQL statements executed under the control of the Database Services module 214. The Database Services module 214 retrieves or receives the SQL statements, wherein the SQL statements are generally stored in a text file on the data storage devices 204 and 206 or are interactively entered into the computer system 202 by an operator sitting at a monitor 226 via operator interface 208. The Database Services module 214 then derives or synthesizes instructions from the SQL statements for execution by the computer system 202.

Generally, the RDBMS software, the SQL statements, and the instructions derived therefrom, are all tangibly embodied in a computer-readable medium, e.g. one or more of the data storage devices 204 and 206. Moreover, the RDBMS software, the SQL statements, and the instructions derived therefrom, are all comprised of instructions which, when read and executed by the computer system 202, causes the computer system 202 to perform the steps necessary to implement and/or use the present invention. Under control of an operating system, the RDBMS software, the SQL statements, and the instructions derived therefrom, may be loaded from the data storage devices 204 and 206 into a memory of the computer system 202 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 2 is not intended to limit the present invention. Indeed, those skilled in the art will recognize that other alternative hardware environments may be used without departing from the scope of the present invention.

Fast Log Apply

The preferred embodiment of the invention provides a fast log apply system 124. The fast log apply system 124 improves database recovery time after a system failure. In particular, the invention uses an ordering of database actions to apply log records on multiple database objects in parallel.

Figure 3:
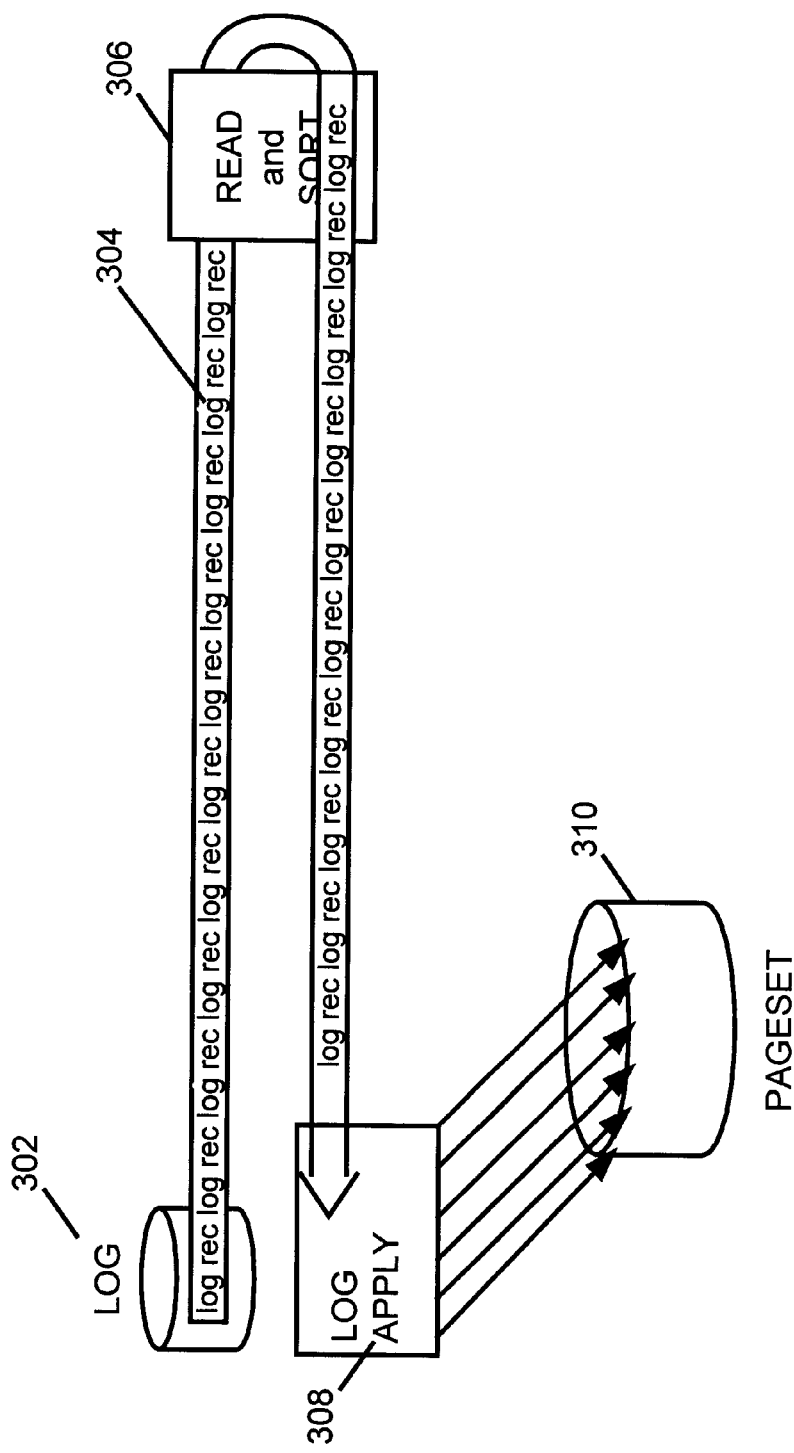
FIG. 3 represents a data recovery technique in accordance with an embodiment of the present invention.

FIG. 3 represents a data recovery technique in accordance with an embodiment of the fast log apply system 224. In particular, the log 302 contains log records 304. The fast log apply system 224 reads, sorts and groups the log records using a sorting key value, as represented by block 306. For example, in the preferred embodiment, the log records are grouped by data page set 310. For each data page set 310, the log records 304 are sorted by data pages. A data page is a unit of data physically stored on a storage device, as is generally known in the art. It may also refer to a data unit temporarily stored in a buffer. Within each data page, the log records are sorted by order of occurrence, e.g. by a time stamp or a sequence number (typically derived from a time stamp). Hereafter, the term "timestamp" shall refer generally to either an actual timestamp or any kind of log sequence number. The log records are then applied to each data page set in parallel, as represented by block 308. Applying a log record involves, if necessary, opening a data page set, reading each data page from a buffer or DASD, and making the required changes to each data page. For each data page, all log records that are read into a buffer and which refer to the data page, are applied to the data page before proceeding to a next data page. The number of log records applied to a data page could be limited by the size of the buffer. This technique speeds up the log apply time because it reduces the number of times that a data page is read. Thus, it improves the database recovery time after a system failure.

Figure 4:
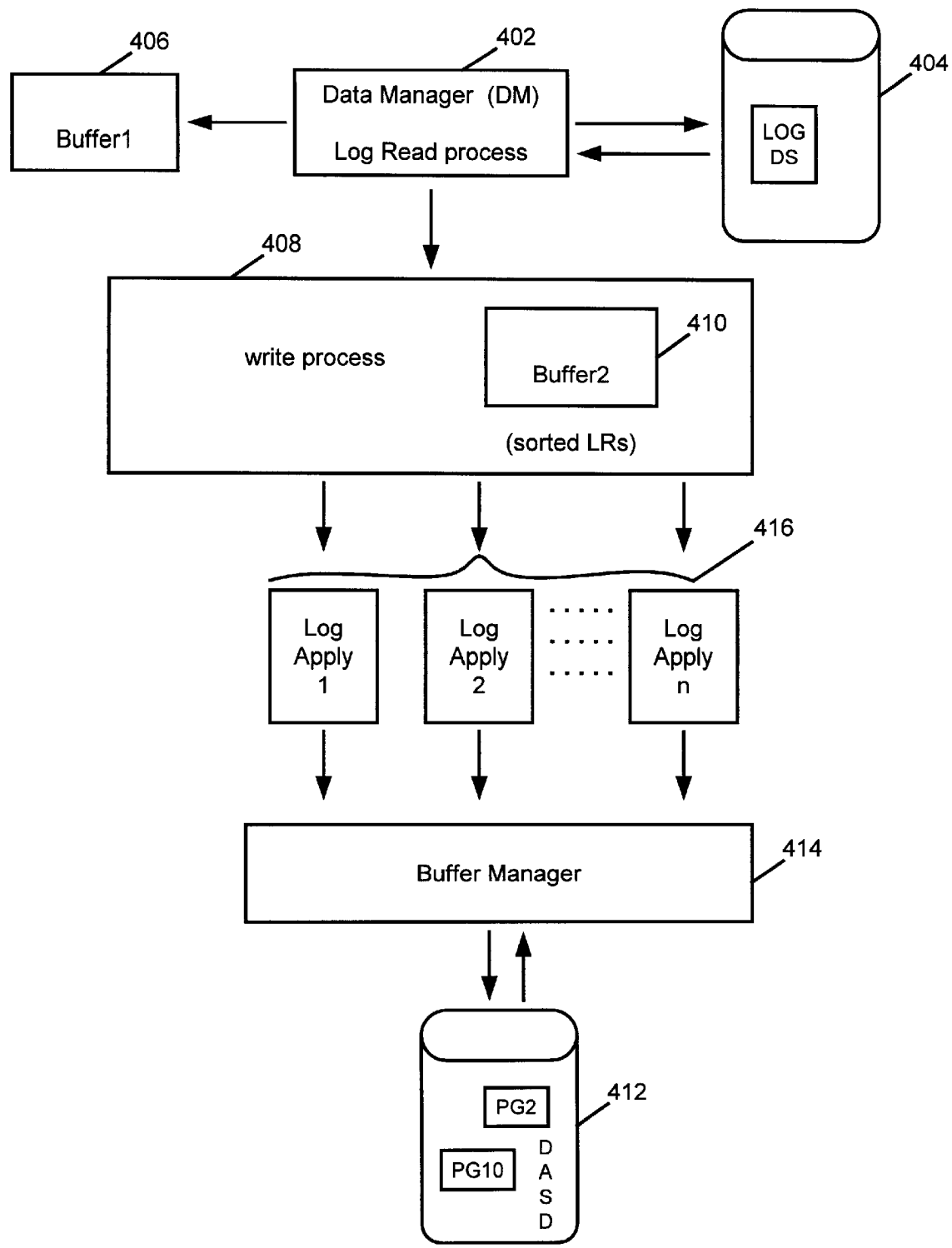
FIG. 4 illustrates a block diagram of a hardware and software configuration for the fast log apply system according to the present invention.

FIG. 4 is a block diagram of the hardware and software that is used to perform the fast log apply in accordance with the present invention. In FIG. 4, the Data Manager (DM) 402 reads the log records from the data storage device 404 and stores the log records in a first buffer 406. In the first buffer 406, the log records are arranged in a time ordered sequence of events. Once the first buffer 406 is full, the DM 402 transfers the log records contained in the first buffer 406 to the Write Process 408. The Write Process 408 sorts the log records and then groups the log records by each data page set. Once the log records are grouped, the Write Process 408 stores the log records in a second buffer 410. The Write Process 408 then applies the sorted log records to each data page set. While the Write Process 408 is applying the sorted log records to each database, the DM 402 may simultaneously read new log records from the data storage device 404 and store the new log records into the first buffer 406. Hence, the applying and reading may occur in parallel.

Applying the log records involves associating a task with each database object. Each task accesses the database from the DASD 412 and reads the associated data page into a buffer manager 414. The task makes all required modifications to the data page. For example, FIG. 4 illustrates tasks 1–n 416. Task 1 is associated with data page set 1, Task 2 is associated with data page set 2, and Task n is associated with data page set n. Each of the tasks 1–n 416 are independent of each other and they access their associated data pages in parallel. In a system having multiple processors, each task is assigned to a processor. Thus, all of the system resources are utilized and the log apply occurs in parallel, creating a multi-tasking structure.

Figure 5:
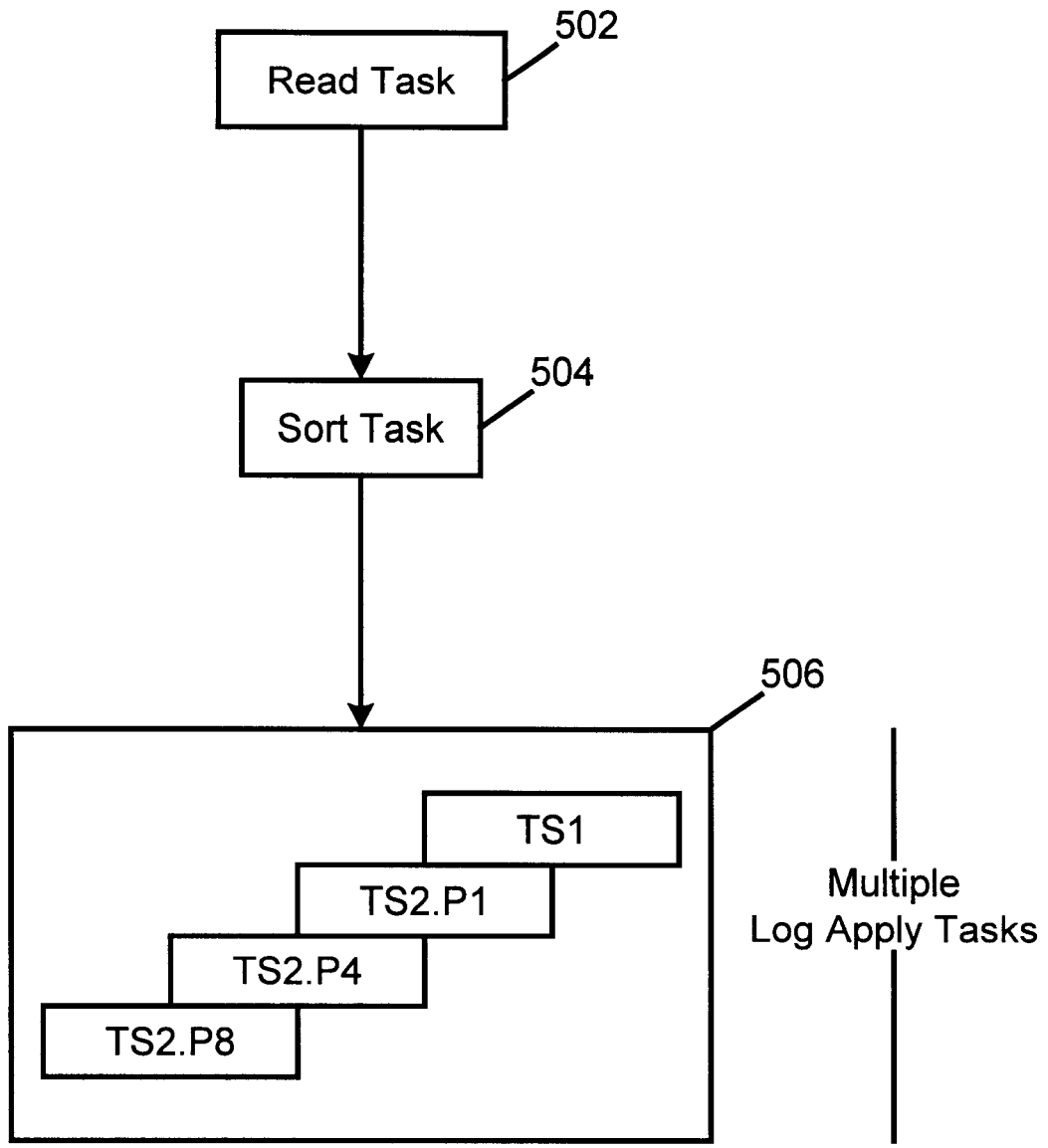
FIG. 5 represents a block diagram of a typical fast log apply multi-tasking structure in accordance with the present invention.

FIG. 5 represents a multi-tasking structure according to the fast log apply system 224. Specifically, block 502 represents the fast log apply system 224 opening the data set, if necessary, and reading the log records. The log records are then sorted as represented by block 504. If multiple tasks are dispatched, the log apply process occurs in parallel as represented by block 506. For example, TS2.P8, TS2.P4, TS2.P1 and TS1 represent four tasks that are performed in parallel. TS2 is a partitioned object, and Pn represents the partition number of the partitioned objects being recovered. In FIG. 5, n equals 8, 4, and 1, respectively. TS1 is a non-partitioned object.

Figure 6:
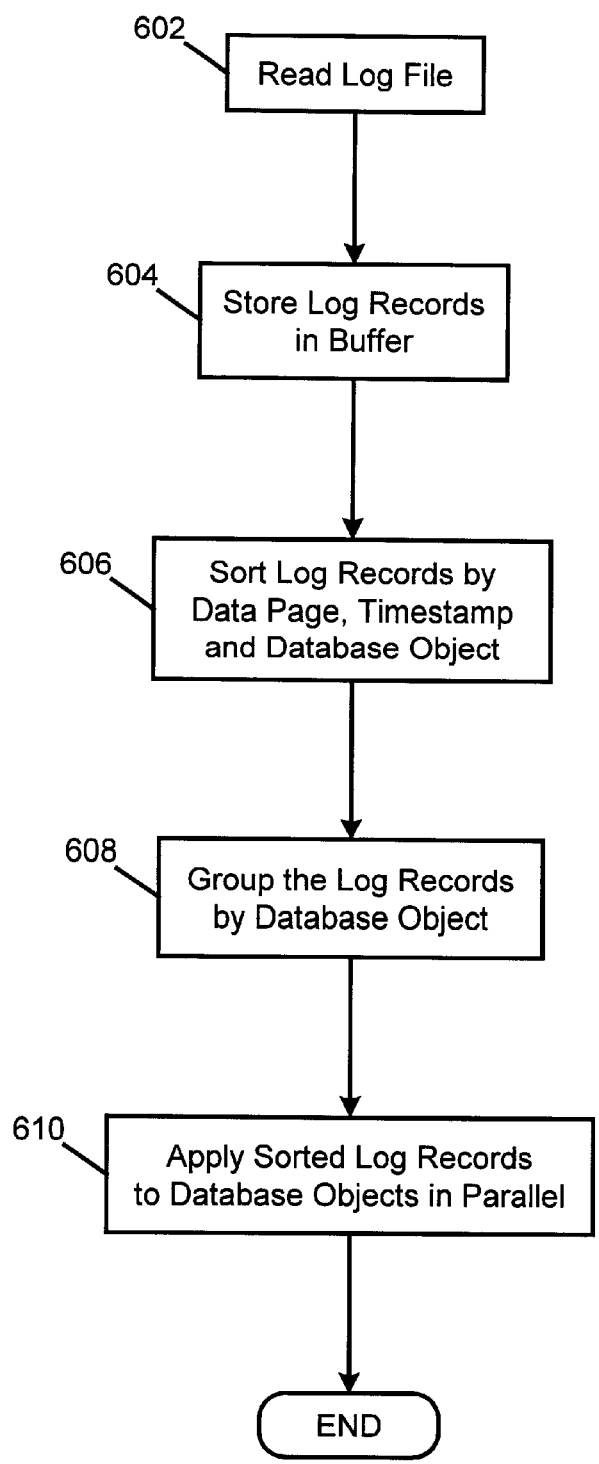
FIG. 6 is a flow chart illustrating the steps performed by the fast log apply system in accordance with the present invention.

FIG. 6 is a flow chart that illustrates the steps performed by the fast log apply system in accordance with the present invention. Block 602 represents the fast log apply system 224 reading a log file after a system failure. The log file has one or more log records. The log records contain modifications to the data pages. Each log record has an associated time stamp.

Block 604 represents the fast log apply system 224 storing each log record in a buffer connected to the computer. The log records are then sorted by database object, data page, and timestamp, as represented by Block 606. Block 608 represents the fast log apply system 224 grouping the log records by database object. Block 610 represents the fast log apply system 224 applying the sorted log records to each database object in parallel.

Conclusion

This concludes the description of the preferred embodiment of the invention. The following describes some alternative embodiments for accomplishing the fast log apply system 224. For example, any type of computer, such as a mainframe, minicomputer, or personal computer, or computer configuration, such as a timesharing mainframe, local area network, or standalone personal computer, could be used with embodiments of the fast log apply system 224.

In summary, a preferred embodiment of the fast log apply system 224 uses the time-ordering of database actions to apply log records on multiple database objects in parallel.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of restoring a database in a computer, the database containing objects and being stored on a data storage device connected to the computer, the method comprising the steps of:

reading a log file, wherein the log file contains at least one modification to a database object;

sorting the read modifications by at least one predefined sorting key value, wherein each database object has an identifier, each of the modifications has an associated time stamp and data page, and the predefined sorting key value comprises the identifier, time stamp, and data page;

grouping the sorted modifications by database object; and applying the sorted modifications to each database object in parallel.

2. The method of claim 1, wherein the method further comprises the steps of:

storing the read modifications in a first buffer; and when the first buffer is full, transferring the stored modifications from the first buffer to a second buffer.

3. The method of claim 1, wherein the grouping step further comprises grouping each read modification by database object in the second buffer.

4. The method of claim 3, wherein the reading step and the applying step occur in parallel.

5. The method of claim 4, wherein the applying step further comprises dispatching a task for each database object.

6. The method of claim 5, wherein dispatching a task further comprises the steps of:

accessing the database from the data storage device;

reading the database object into a buffer manager; and applying one or more modifications to the database object.

7. An apparatus for restoring a database in a computer, the database containing objects and being stored on a data storage device connected to a computer, comprising:

a computer having a data storage device connected thereto, wherein the data storage device stores a database;

one or more computer programs, performed by the computer, for reading a log file, wherein the log file contains at least one modification to a database object, for sorting the read modifications by at least one predefined sorting key value, for grouping the sorted modifications by database object, and for applying the sorted modifications to each database object in parallel, wherein each database object has an identifier, each of the modifications has an associated time stamp and data page, and the predefined sorting key value comprises the identifier, time stamp, and data page.

8. The apparatus of claim 7, further comprising:

means, performed by the computer, for storing the read modifications in a first buffer; and means, performed by the computer, for transferring the stored modification from the first buffer to a second buffer, when the first buffer is full.

9. The apparatus of claim 7, wherein the means for grouping comprises grouping each of the sorted modifications by database object in the second buffer.

10. The apparatus of claim 9, wherein the means for reading and the means for applying occur in parallel.

11. The apparatus of claim 10, wherein the means for applying comprises a means for dispatching a task for each database object.

12. The apparatus of claim 11, wherein the means for dispatching a task further comprises:

means, performed by the computer, for accessing the database from the data storage device;

means, performed by the computer, for reading the database object into a buffer manager; and means, performed by the computer, for applying one or more modifications to the database object, and the means for applying comprises means for dispatching, in parallel, a task for each database object.

13. An article of manufacture comprising a computer program carrier readable by a computer and embodying one or more instructions executable by the computer to perform method steps for restoring a database in a computer, the database containing objects and being stored on a data storage device connected to the computer, the method comprising the steps of:

reading a log file, wherein the log file contains at least one modification to a database object;

sorting the read modifications by at least one predefined sorting key value, wherein each database object has an identifier, each of the modifications has an associated time stamp and data page, and the predefined sorting key value comprises the identifier, time stamp, and data page;

grouping the sorted modifications by database object; and applying the sorted modifications to each database object in parallel.

14. The article of manufacture of claim 13, wherein the method further comprises the step of:

storing the read modifications in a first buffer; and when the first buffer is full, transferring each stored modification from the first buffer to a second buffer.

15. The article of manufacture of claim 13, wherein the grouping step further comprises grouping each sorted modification by database object in the second buffer.

16. The article of manufacture of claim 15, wherein the reading step and the applying step occur in parallel.

17. The article of manufacture of claim 16, wherein the applying step further comprises dispatching a task for each database object.

18. The article of manufacture of claim 17, wherein dispatching a task further comprises the steps of:

accessing the database from the data storage device;

reading the database object into a buffer manager; and applying one or more modifications to the database object.

* * * * *